United States Patent
Thornhill et al.

(10) Patent No.: US 10,904,383 B1
(45) Date of Patent: Jan. 26, 2021

(54) ASSIGNING OPERATORS TO INCIDENTS

(71) Applicant: INTERNATIONAL BUSINESS MACHINES CORPORATION, Armonk, NY (US)

(72) Inventors: Matthew Richard James Thornhill, London (GB); Luke Taher, Heswall (GB); David Jon Griffin, Reigate (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/794,586

(22) Filed: Feb. 19, 2020

(51) Int. Cl.
*H04M 3/493* (2006.01)
*H04M 3/51* (2006.01)

(52) U.S. Cl.
CPC ........... *H04M 3/4933* (2013.01); *H04M 3/51* (2013.01)

(58) Field of Classification Search
CPC ..... H04M 3/4933; H04M 3/51; G06F 11/079; G06F 11/0709; G06F 11/0751; G06F 11/0787; G06F 11/0793; H04L 41/06; H04L 41/22
USPC ....... 379/1.01, 9.01, 9.02, 9.03, 9.04, 10.01, 379/114.01, 133, 135, 32.01
See application file for complete search history.

(56) References Cited

U.S. PATENT DOCUMENTS

| | | | |
|---|---|---|---|
| 6,507,821 B1 | 1/2003 | Stephanou | |
| 9,753,800 B1* | 9/2017 | Jadunandan | ........ H04L 41/0856 |
| 9,779,386 B2 | 10/2017 | Swierz, III | |
| 9,785,988 B2 | 10/2017 | Petri | |
| 10,263,836 B2* | 4/2019 | Jain | ...................... H04L 41/0672 |
| 10,395,323 B2* | 8/2019 | Aqlan | .................... G06Q 50/04 |
| 2002/0029167 A1 | 3/2002 | Muller | |
| 2008/0181100 A1* | 7/2008 | Yang | ................... H04L 41/0654 370/216 |
| 2009/0012833 A1 | 1/2009 | Kuhlke | |
| 2010/0083029 A1* | 4/2010 | Erickson | ............ G06F 11/0709 714/2 |
| 2014/0068348 A1* | 3/2014 | Mondal | .................. H04L 41/16 714/45 |

(Continued)

OTHER PUBLICATIONS

Mell et al., "The NIST Definition of Cloud Computing", National Institute of Standards and Technology, Special Publication 800-145, Sep. 2011, pp. 1-7.

(Continued)

*Primary Examiner* — Binh Kien Tieu
(74) *Attorney, Agent, or Firm* — John Noh

(57) ABSTRACT

A method, a computer program product, and a computer system assign an operator to service an incident. The method includes determining a type of incident. The method includes determining a command group based on the type of incident according to a first mapping. The first mapping is indicative of a mapping between the command group and the type of incident based on historical resolutions of historical incidents. The command group includes at least one command used in resolving the type of incident for a historical incident. The method includes determining an operator who has used the command group according to a second mapping. The second mapping is indicative of a mapping between the command group and the operator based on historical resolutions of historical incidents. The operator has used at least one command in the command group. The method includes assigning the operator to the incident.

14 Claims, 7 Drawing Sheets

(56) References Cited

U.S. PATENT DOCUMENTS

| | | | |
|---|---|---|---|
| 2014/0180738 A1* | 6/2014 | Phillipps | G06Q 10/0631 |
| | | | 705/7.12 |
| 2015/0347950 A1 | 12/2015 | Goyal | |
| 2016/0179598 A1* | 6/2016 | Lvin | H04L 41/0636 |
| | | | 714/48 |
| 2017/0132724 A1* | 5/2017 | Aqlan | G06Q 10/063112 |
| 2017/0221373 A1 | 8/2017 | Dasgupta | |
| 2017/0249283 A1 | 8/2017 | Gupta | |
| 2017/0304707 A1 | 10/2017 | Morton | |
| 2018/0060786 A1 | 3/2018 | Venkataraman | |
| 2018/0242990 A1 | 8/2018 | Dryden | |
| 2019/0130413 A1 | 5/2019 | Nelson | |
| 2019/0197457 A1 | 6/2019 | Chan | |
| 2019/0215236 A1* | 7/2019 | Jain | H04L 41/0686 |
| 2020/0004618 A1 | 1/2020 | Thornhill | |

OTHER PUBLICATIONS

Ross et al., "Automatic Resource Assignment for Issue Resolution", Technical Disclosure Commons, Defensive Publication Series, Aug. 30, 2018, pp. 1-7.

* cited by examiner

ASSIGNING OPERATORS TO INCIDENTS

BACKGROUND

The exemplary embodiments relate generally to information technology, and more particularly to an automated assignment of an operator to service an incident based on historical resolution information.

A client data center that may utilize a cloud and/or hybrid environment may employ a plurality of different types of information technology (IT) services. For proper operation of the client data center, each of the IT services must operate as intended. The monitoring and repair of the IT services in the client data center may be difficult as there may be a plurality of different layers that are involved in providing the IT services. When an incident or failure occurs, the client data center may have one or more teams supporting the IT services where each team may include one or more operators. The teams and any operator assigned to address the incident are required to know that an incident has occurred and need some way of discovering how to diagnose and fix the incident. In resolving the incident, the operator may enter a sequence of commands that may lead to a resolution. However, current approaches may utilize a variety of different factors in determining which team and which operator to be assigned the task of resolving the incident. These approaches are often performed manually by a team leader or administrator of the client data center where the approaches lead to an inefficient approach which is time consuming and prone to error, especially when an initially assigned operator may be ill equipped to handle the incident.

SUMMARY

The exemplary embodiments disclose a method, a computer program product, and a computer system for assigning an operator to service an incident. The method comprises determining a type of incident associated with the incident. The method comprises determining a command group applicable for use based on the type of incident according to a first mapping. The first mapping is indicative of a mapping between the command group and the type of incident based on historical resolutions of historical incidents. The command group includes at least one command used in resolving the type of incident for a historical incident. The method comprises determining an operator who has used the command group according to a second mapping. The second mapping is indicative of a mapping between the command group and the operator based on historical resolutions of historical incidents. The operator has used at least one command in the command group. The method comprises assigning the operator to the incident.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which.

The drawings are not necessarily to scale. The drawings are merely schematic representations, not intended to portray specific parameters of the exemplary embodiments. The drawings are intended to depict only typical exemplary embodiments. In the drawings, like numbering represents like elements.

DETAILED DESCRIPTION OF THE SEVERAL VIEWS OF THE DRAWINGS

Figure 1:
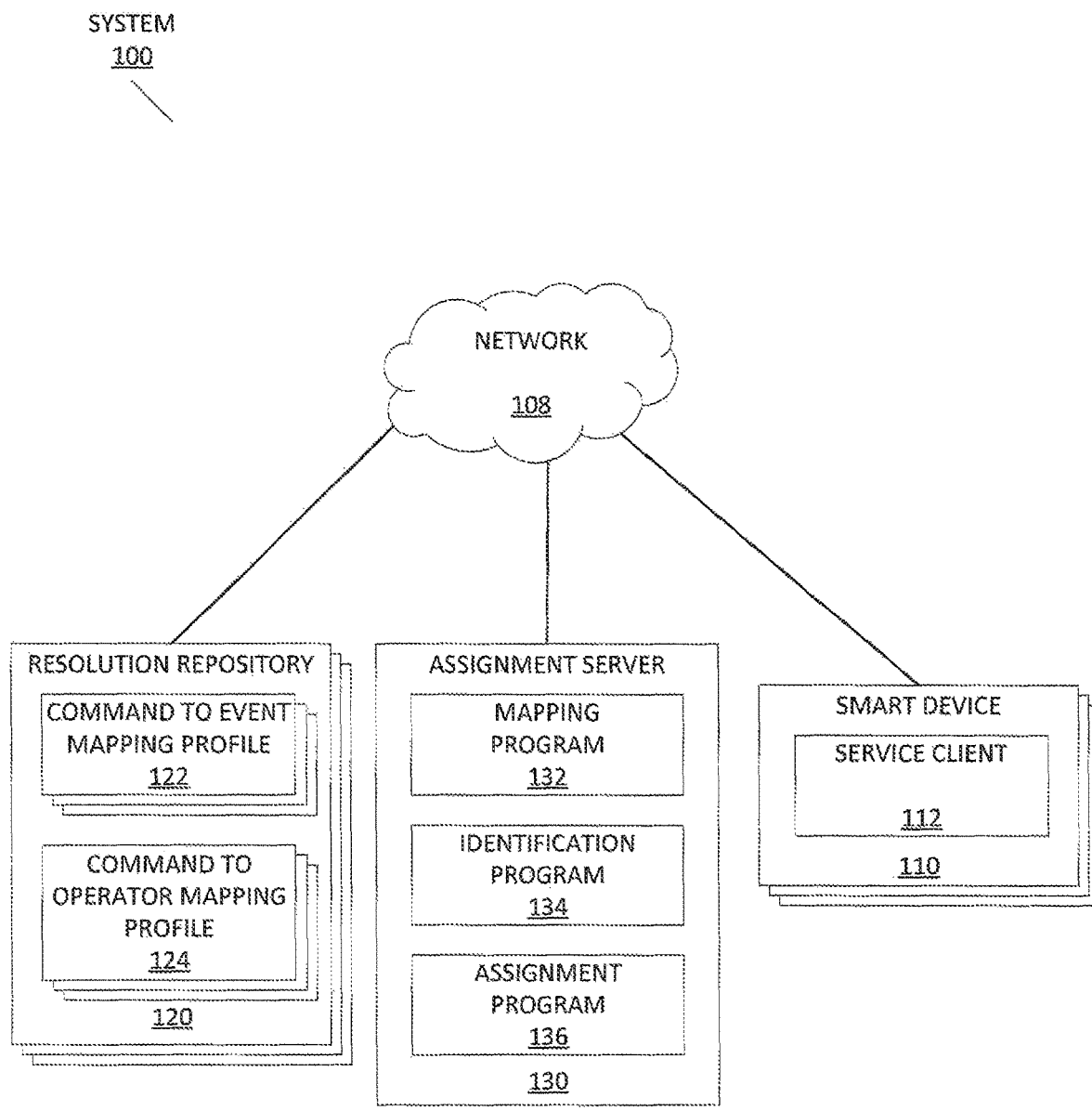
FIG. 1 depicts an exemplary schematic diagram of an incident assignment system 100, in accordance with the exemplary embodiments.

Detailed embodiments of the claimed structures and methods are disclosed herein; however, it can be understood that the disclosed embodiments are merely illustrative of the claimed structures and methods that may be embodied in various forms. The exemplary embodiments are only illustrative and may, however, be embodied in many different forms and should not be construed as limited to the exemplary embodiments set forth herein. Rather, these exemplary embodiments are provided so that this disclosure will be thorough and complete, and will fully convey the scope to be covered by the exemplary embodiments to those skilled in the art. In the description, details of well-known features and techniques may be omitted to avoid unnecessarily obscuring the presented embodiments.

References in the specification to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the interest of not obscuring the presentation of the exemplary embodiments, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is focused on the distinctive features or elements according to the various exemplary embodiments.

The exemplary embodiments are directed to a method, computer program product, and system for assigning an operator to service an incident related to an information technology (IT) service issue arising in a client data center. As will be described in greater detail herein, the exemplary embodiments are configured to assign the IT issue to an operator using a mapping between operator skill sets and types of incidents through a mapping between command groups of commands used in resolving incidents and the types of incidents. The exemplary embodiments provide a mechanism to select an appropriate operator, particularly when the operator has previously run at least a subset of the command groups required to resolve a type of incident, even if the operator has not specifically resolved the specified type at a previous time. Key benefits of the exemplary embodiments may include a capability for an operator to be assigned to resolve an incident at a granular level beyond the level of the event associated with the type of incident where the operator may resolve the incident in a more efficient manner. Detailed implementation of the exemplary embodiments follows.

Conventional approaches to assigning an operator to resolve an incident may involve a manual selection process or a high level approach. For example, a conventional approach involves an administrator of the client data center to manually assign an incident to an operator. The administrator may select the operator as the first responder to the incident without considering all factors and instead rely on availability with an assumption that the operator is capable of handling the incident. In selecting the operator, the administrator may track staff ability and experience by managers through a database. In another example, a conventional approach may utilize a textual analysis of comments, a work log, and a description of a problem ticket for an incident. However, this conventional approach relies on a resolver entering information accurately which may be prone to user error, apathy, manipulation, etc. Additionally, using analysis of natural language may be prone to error due to the differences between the use of language by different users, operators, etc. In a further example, a conventional approach may use ticket descriptions, ticket attributes, and text analytics to determine skills of operators. However, this conventional approach does not incorporate commands that are used in previous resolution of incidents which would provide insights into how well the commands are used to resolve the respective incidents or types of incidents. In yet another example, a conventional approach tracks a success of operators at resolving different ticket types to rank operator skill levels for each ticket type and assign the most skilled operator for new tickets. However, this conventional approach relies on all tickets being assigned a user-defined type and that type being specific enough to map to a specific skill as determined for each operator.

Figure 7:
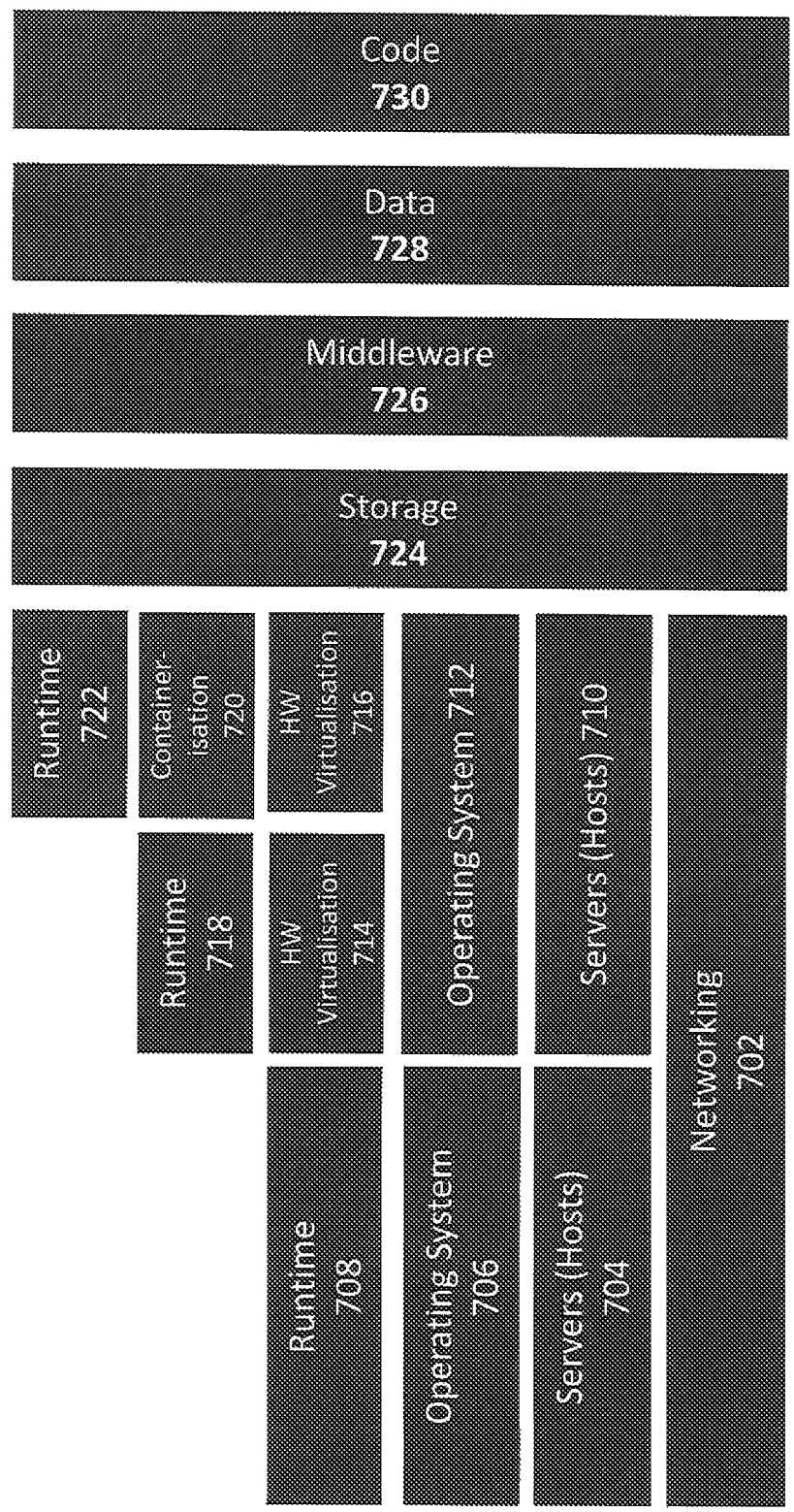
FIG. 7 depicts fix layers, in accordance with the exemplary embodiments.

In contrast to conventional approaches, the exemplary embodiments may consider the various layers involved in providing IT services. For example, the layers may be directed to Code, Data, Runtime, Middleware, Operating System, Virtualization, Servers, Storage, Networking, etc. FIG. 7 depicts fix layers 700, in accordance with the exemplary embodiments. As illustrated, there may be a networking layer 702. As represented, in a first direction (e.g., vertical orientation), a first stack including a plurality of layers may be linked or associated. For example, in the first stack, there may be a first servers layer 704 followed by a first operating system layer 706 followed by a first runtime layer 708. In a parallel manner, in a second stack over the networking layer 702, there may be a second servers layer 710 followed by a second operating system layer 712. Over the second operating system layer 712, there may be a first following stack including a first hardware virtualization layer 714 and a second following stack including a second hardware virtualization layer 716. Over the first hardware virtualization layer 714 may be a second runtime layer 718. Over the second hardware virtualization layer 716 may be a containerization layer 720 followed by a third runtime layer 722. In a second direction (e.g., horizontal orientation), a second stack including a plurality of layers may be linked or associated. For example, in the second stack, there may be a storage layer 724 followed by a middleware layer 726 followed by a data layer 728 followed by a code layer 730. In this manner, according to an exemplary implementation, there may be a plurality of fix layers in which relationships may be identified between skillsets. For example, the networking layer 702 may be relatively close to the servers layers 704 or 710. As will be described below, the exemplary embodiments may map these fix layers and the corresponding commands that may be used in resolving issues linked to these fix layers in determining how to assign an incident that has been identified as including one or more of these fix layers.

Across the many layers, it is key that all required components are operating correctly and that no parts of the system have failed. The exemplary embodiments may utilize an IT Service Management feature that provides a means for support teams to track and assign incidents that may arise. The incidents may be assigned to a member of the support team, known as an operator, who is then responsible for resolving the incident, usually by issuing a sequence of computer commands on the affected systems. In the process of assigning the incident to an operator, the exemplary embodiments provide an automated system capable of tracking which operator is most likely to be able to successfully resolve an incident and automatically assign it to that operator. Accordingly, the exemplary embodiments may reduce first-responder workload, reduce the number of events that have to be reassigned due to an operator not having the correct skills, etc. In this manner, the automatic assignment of an incident to the operator determined to be the best or optimal under the current conditions according to the exemplary embodiments may be beneficial as the recovery from the incident is minimized which saves both time and money. The process required to carry out such automation according to the exemplary embodiments may capture and analyze operator skills based on commands that may be used for the incident allowing an entity to adopt a data driven approach to learning associated with incident resolution.

The exemplary embodiments provide an automated way of determining the domain knowledge of operators based on their interactions with command line interfaces (e.g., via commands that are entered to resolve incidents) of problematic systems. By breaking down event resolution into groups of commands issued to fix a given incident or event, the exemplary embodiments are configured to generate a many to many mapping between incident types and groups of commands. Additionally, through the monitoring of which operators issued the commands, the exemplary embodiments are configured to determine which operators are experienced with which command groups. Accordingly, the exemplary embodiments may generate a further mapping between operator skill sets and multiple types of incidents through the mapping between command groups and types of incidents. Through the mappings, the exemplary embodiments may select an appropriate operator, particularly if the operator has previously run a subset of the command groups required to resolve an incident type, even if the operator has not specifically resolved that incident type before. Accordingly, the exemplary embodiments may be configured to infer the abilities of the operators that entered commands and may provide an analysis that allows the exemplary embodiments to determine which operator is best suited to solve an incident based on the commands that the operator has used for previous resolutions of incidents.

The exemplary embodiments are described with regard to IT services that may be used at a client data center and assignment of incidents for the IT services to operators. However, the exemplary embodiments may be utilized in any environment in which an operator or entity is assigned to resolve an incident of any feature for which there is an issue.

FIG. 1 depicts an incident assignment system 100, in accordance with the exemplary embodiments. According to the exemplary embodiments, the incident assignment system 100 may include one or more smart devices 110, one or more resolution repositories 120, and an assignment server 130, which may all be interconnected via a network 108. While programming and data of the exemplary embodiments may be stored and accessed remotely across several servers via the network 108, programming and data of the exemplary embodiments may alternatively or additionally be stored locally on as few as one physical computing device or amongst other computing devices than those depicted.

In the exemplary embodiments, the network 108 may be a communication channel capable of transferring data between connected devices. Accordingly, the components of the incident assignment system 100 may represent network components or network devices interconnected via the network 108. In the exemplary embodiments, the network 108 may be the Internet, representing a worldwide collection of networks and gateways to support communications between devices connected to the Internet. Moreover, the network 108 may utilize various types of connections such as wired, wireless, fiber optic, etc. which may be implemented as an intranet network, a local area network (LAN), a wide area network (WAN), or a combination thereof. In further embodiments, the network 108 may be a Bluetooth network, a WiFi network, or a combination thereof. In yet further embodiments, the network 108 may be a telecommunications network used to facilitate telephone calls between two or more parties comprising a landline network, a wireless network, a closed network, a satellite network, or a combination thereof. In general, the network 108 may represent any combination of connections and protocols that will support communications between connected devices. For example, the network 108 may also represent direct or indirect wired or wireless connections between the components of the incident assignment system 100 that do not utilize the network 108.

In the exemplary embodiments, the smart device 110 may include a service client 112 and may be an enterprise server, a laptop computer, a notebook, a tablet computer, a netbook computer, a personal computer (PC), a desktop computer, a server, a personal digital assistant (PDA), a rotary phone, a touchtone phone, a smart phone, a mobile phone, a virtual device, a thin client, an Internet of Things (IoT) device, or any other electronic device or computing system capable of receiving and sending data to and from other computing devices. While the smart device 110 is shown as a single device, in other embodiments, the smart device 110 may be comprised of a cluster or plurality of computing devices, in a modular manner, etc., working together or working independently. The smart device 110 is described in greater detail as a hardware implementation with reference to FIG. 4, as part of a cloud implementation with reference to FIG. 5, and/or as utilizing functional abstraction layers for processing with reference to FIG. 6. Each of the one or more smart devices 110 may be used by a respective operator having a corresponding operator skill set used in resolving incidents arising at a client data center.

In the exemplary embodiments, the service client 112 may act as a client in a client-server relationship and may be a software, hardware, and/or firmware based application capable of allowing an operator to enter commands used in resolving an incident assigned to the operator via the network 108. For example, the service client 112 may be in a client-server relationship with an IT Service Management system of the client data center. In embodiments, the service client 112 may operate as a user interface allowing the user to enter the commands that affect a platform (not shown) on which the client data center operates as well as interact with one or more components of the incident assignment system 100, and utilize various wired and/or wireless connection protocols for data transmission and exchange associated with cognitively distributing email attachments to recipients, including Bluetooth, 2.4 gHz and 5 gHz internet, near-field communication, Z-Wave, Zigbee, etc.

Upon being assigned an incident (e.g., received as a ticket from a user who notices an issue while using the IT services, as determined from running tests or maintenance operations, etc.), the user may utilize the service client 112 to enter commands that attempt to resolve the incident. For example, the commands may be computer commands that control a manner in which the system, the constituent fix layers, etc. associated with the IT services operate. The computer commands may be directed to a specific fix layer. The computer commands may also be specific to a component, a platform, etc. on which the IT service is provided. The operator may utilize a plurality of different commands that may or may not resolve the incident.

In the exemplary embodiments, the resolution repository 120 may include one or more command to event (C2E) mapping profiles 122 and one or more command to operator (C2O) mapping profiles 124 and may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of storing, receiving, and sending data to and from other computing devices. While the resolution repository 120 is shown as a single device, in other embodiments, the resolution repository 120 may be comprised of a cluster or plurality of electronic devices, in a modular manner, etc., working together or working independently. While the resolution repository 120 is also shown as a separate component, in other embodiments, the resolution repository 120 may be incorporated with one or more of the other components of the incident assignment system 100. For example, the resolution repository 120 may be incorporated in the assignment server 130. Thus, access to the resolution repository 120 by the assignment server 130 may be performed locally. The resolution repository 120 is described in greater detail as a hardware implementation with reference to FIG. 4, as part of a cloud implementation with reference to FIG. 5, and/or as utilizing functional abstraction layers for processing with reference to FIG. 6. The C2E profiles 122 and the C2O profiles 124 will be described in further detail below with regard to the operations of the assignment server 130.

In the exemplary embodiments, the assignment server 130 may include a mapping program 132, an identification program 134, and an assignment program 136 and act as a server in a client-server relationship with the email client 112 as well as be in a communicative relationship with the resolution repository 120. The assignment server 130 may be an enterprise server, a laptop computer, a notebook, a tablet computer, a netbook computer, a PC, a desktop computer, a server, a PDA, a rotary phone, a touchtone phone, a smart phone, a mobile phone, a virtual device, a thin client, an IoT device, or any other electronic device or computing system capable of receiving and sending data to and from other computing devices. While the assignment server 130 is shown as a single device, in other embodiments, the assignment server 130 may be comprised of a cluster or plurality of computing devices, working together or working independently. While the assignment server 130 is also shown as a separate component, in other embodiments, the operations and features of the assignment server 130 may be incorporated with one or more of the other components of the incident assignment system 100. For example, the operations and features of the assignment server 130 may be incorporated in the smart device 110, particularly the smart device 110 of the operator who is resolving an incident. The assignment server 130 is described in greater detail as a hardware implementation with reference to FIG. 4, as part of a cloud implementation with reference to FIG. 5, and/or as utilizing functional abstraction layers for processing with reference to FIG. 6.

In the exemplary embodiments, the mapping program 132 may be a software, hardware, and/or firmware application configured to receive historical information related to commands used in resolving previously addressed incidents, information related to operators assigned to previously addressed incidents as well as any commands that were respectively entered, and any other historical information that may be related to previously addressed incidents. Based on the information, the mapping program 132 may generate the C2E mapping profiles 122 and the C2O mapping profiles 124. The mapping program 132 may monitor incidents being resolved as the operator is entering commands via the service client 112. The mapping program 132 may store the data associated with resolution of incidents. For example, the resolution repository 120 may include historical information of previous incidents (not shown) at the client data center. The resolution repository 120 may include historical information of incidents that may occur outside the client data center. The mapping program 132 may store the data with various associated information including, for example, the type of incident, a timestamp of when the incident occurred, a timestamp of when the incident was resolved, any operator assigned to service the incident, the commands entered by each operator assigned to service the incident, a fix layer on which the incident is associated, etc.

According to an exemplary implementation, the mapping program 132 may include an incident management application (not shown) that monitors the operators utilizing the service client 112 in entering terminal commands to fix incidents. According to an exemplary embodiment, the operators may have access to runbooks that list a set of commands to be used for a given type of incident. Thus, the runbooks may provide instructions to operators in handling future incidents that are substantially similar to incidents that are resolved at a previous time. The exemplary embodiments may be directed toward incidents in which there is no runbook available. Thus, the incident management application of the mapping program 132 may monitor events that do not have an associated runbook. In monitoring these incidents, the mapping program 132 may identify and capture the commands entered by the operator and store the commands in a reference for the incident alongside other pertinent information. The other pertinent information may include an identity of the operator, a type of the incident, the time taken to enter the commands, a flag to indicate a success or failure of each command, a fix layer involved in the incident, an identity of the manufacturer of hardware and/or software components of the incident, etc.

Based on the information that is received regarding historical incidents and all associated data, the mapping program 132 may be configured to identify common command groups across the historical incidents based on the commands used for the historical incidents. The mapping program 132 may analyze commands entered by operators to resolve historical incidents (e.g., whether the commands were successfully or unsuccessfully utilized in the resolution) and may categorize the commands into groups of commands. Each command group may represent a set of commands that affect a certain technology stack and/or knowledge area that is associated with the incidents. For example, a command group may be commands that target a specific manufacturer of router while another command group may target a certain vendor's cloud platform.

The mapping program 132 may group the commands based on a variety of factors. For example, the mapping program 132 may group the commands based on hard coded command sets (e.g., a hard coded rule that states all commands starting with a specific prefix such as acmectl are targeting a specific cloud platform). In another example, the mapping program 132 may group the commands by determining commands that occur together above a predetermined frequency. In this manner, the mapping program 132 may be configured with an association rule mining feature. In a further example, the mapping program 132 may group the commands by determining commands that have text that is above a predetermined similarity metric. In yet another example, the mapping program 132 may group the commands by measuring an effect of running commands and determining the commands that have a result within a further predetermined similarity metric. In an additional example, the mapping program 132 may parse many pages, product documentation, etc. to discover groups of commands. In an extra example, the mapping program 132 may receive instructions from manual inputs as to the manner in which the commands are to be grouped. The mapping program 132 may also be configured to utilize any one or any combination of the above mechanisms to group the commands.

Using the command groups, the mapping program 132 may generate the C2E profiles 122 by mapping incident types to command groups. The mapping program 132 may analyze the command groups to create a mapping of command groups to the incident types that the command groups have been used to resolve historical incidents. For example, a command group may have been discovered that restarts an application on a specific cloud platform for which an incident has arisen. The commands in the command group may have been used in the past by one or more operators to resolve an incident involving the application being unresponsive. The mapping program 132 may use the result from this association in a mapping between the command group and the incident type. Through this linking between command groups and incident types, the mapping program 132 may generate the C2E profiles 122 as a many to many mapping between command groups and incident types where the same command group may be used to resolve one or more incident types and one incident type may be resolved by one or more command groups.

Using the command groups, the mapping program 132 may also generate the C2O profiles 124 by mapping operators to command groups. As described above, the incident management application of the mapping program 132 may record the operator that entered the commands during resolution of historical incidents. The incident management application may also record the commands that each operator entered during resolution of historical incidents. Based on this information, the mapping program 132 may determine a mapping between the operators who have previously executed each group of commands. Through this linking between operators and command groups, the mapping program 132 may generate the C2O profiles 124 as a many to many mapping between operators and command groups where a single operator may likely have used a plurality of command groups to resolve incidents in the past and multiple operators may have independently used the same group of command groups to resolve different types of incidents.

Through the above processes, the mapping program 132 may monitor resolution of incidents that are reported for the client data center. The mapping program 132 may record the operators who are entering commands, the commands that are being entered, the incident types for the various incidents, etc. Based on this information, the mapping program 132 may generate the C2E mapping profiles 122 and the C2O mapping profiles 124. As will be described in detail below, the C2E mapping profiles 122 and the C2O mapping profiles 124 may be used in identifying an operator to be assigned to an incident that has arisen at the client data center.

The client data center may include a system in which incidents may be reported. For example, a user of the client data center may be utilizing various features. In using one of the features, the user may determine an incident by recognizing that the feature is not operating as intended. The user may fill out a ticket and submit the ticket to an administrative system that resolves such incidents. In another example, the client data center may be performing scheduled or routine maintenance on the various features and operations of the client data center. The results of the maintenance may identify incidents that may have arisen. These incidents may be collected and submitted to the administrative system.

When a new incident is reported, the assignment server 130 may perform further operations to assign an operator to the incident. In the exemplary embodiments, the identification program 134 may be a software, hardware, and/or firmware application configured to identify operators who may be capable of resolving the new incident. The identification program 134 may have access to the C2E mapping profiles 122 and the C2O mapping profiles 124 in the resolution repository 120. Using the C2E mapping profiles 122 and the C2O mapping profiles 124 along with information of the new incident, the identification program 134 may determine one or more operators who may be equipped with the skill set necessary to resolve the new incident.

The identification program 134 may be configured to determine a type of the incident. For example, based on information included in a ticket for the incident, manually entered information regarding the incident, etc., the identification program 134 may identify the type of incident including one or more fix layers that the incident resides, a identification of hardware and/or software components involved with the incident, etc. By determining the type of incident, the identification program 134 may perform subsequent operations in assigning the new incident to an operator.

The identification program 134 may also be configured to receive information regarding the type of incident. For example, the client data center may include an administrative system or management system that is configured to identify the type of incident. The identification program 134 may receive the type of incident to perform the subsequent operations. Those skilled in the art will understand that there may be a variety of different mechanisms that may be used in identifying the type of incident that the new incident may be. The assignment server 130 may be configured to incorporate any of these mechanisms within the scope of the exemplary embodiments.

Based on the type of incident, the identification program 134 may utilize the C2E mapping profiles 122 to determine the command groups that are applicable to the type of incident. Based on the many to many mapping that the C2E mapping profiles 122 may indicate, the identification program 134 may determine the one or more command groups that may be involved in resolving the new incident based on historical resolutions of incidents that may be related to the type of incident. The identification program 134 may utilize the C2O mapping profiles 124 to determine which operators have used the command groups determined based on the type of incident and the C2E mapping profiles 122. In an exemplary embodiment, the identification program 134 may generate a list of operators who have successfully used the identified command groups (e.g., based on the type of incident via the C2E mapping profiles 122) in resolving previous incidents.

The identification program 134 may utilize other information that may be pertinent in determining operators who may be equipped to resolve the new incident. For example, the identification program 134 may have access to operator profiles (not shown) which may be stored in the resolution repository 120 or other repository. The operator profiles for each operator may be populated with various types of information that may be used in identifying operators who may resolve the new incident. For example, the operator profiles may include information indicating a job title, a department in which the user or recipient belongs, a current status (e.g., active, inactive, prospective, retired, etc.), responsibilities of the job position, projects on which the user and/or recipients are a part currently and/or historically, etc. In another example, the operator profiles may include information indicative of expertise, knowledge, coursework, interest, etc. in various fields. The technical expertise may be, for example, a technical discipline, a scientific practice, etc. Accordingly, the identification program 134 may also utilize the operator profiles to provide further information that may be used in identifying the operators in the list.

In the exemplary embodiments, the assignment program 136 may be a software, hardware, and/or firmware application configured to receive the list of operators identified by the identification program 134 and rank the operators to determine which of the operators is to be assigned in resolving the new incident. The assignment program 136 may utilize various standards, criteria, etc. in ranking the identified operators.

According to an exemplary implementation, the assignment program 136 may determine which operator is best positioned to resolve the new incident by ranking the operators based on previous usages of the command groups associated with the type of incident of the new incident. The ranking may be calculated using a set of equations directed to an operator-success parameter. For example, the equation may be the following:

$$F_t = \frac{Wn_{st}}{N_{st}} + (1-W)\left(1 - \frac{n_{ft}}{N_{ft}}\right) \quad \text{(Equation 1)}$$

$$S_0 = F_0 \quad \text{(Equation 2)}$$

$$S_t = \alpha F_t + (1-\alpha) S_{t-1} \quad \text{(Equation 3)}$$

In Equation 1, the variable W represents a success or failure weighting factor that is selected as a value between 0 and 1. For example, W may be set to 0.7 that indicates that success is weighted higher than failure. The variable $n_{st}$ may represent a number of successes at a time window t for a selected operator. The variable $N_{st}$ may represent a number of successes at a time window t for all operators. The variable $n_{ft}$ may represent a number of failures at a time window t for a selected operator. The variable $N_{ft}$ may represent a number of failures at a time window t for all operators. In Equation 2, the variable $S_0$ may represent a time weighted success factor at time 0 while the variable $F_0$ may represent a success factor at time 0. In Equation 3, the variable $S_t$ may represent a time weighted success factor at time t where t produces a current time weighted success factor for the operator between 0 (e.g., indicative of inexperienced) and 1 (e.g., indicative of experienced). The variable $F_t$ may represent a success factor at time t while $S_{t-1}$ may represent a time weighted success factor at time t–1. The variable a may represent a smoothing factor that is selected as a value between 0 and 1 and determines an amount that older factors contribute to the overall success rate.

Using Equations 1-3, the assignment program 136 may rank each of the operators that are identified by the identification program 134 for the new incident. Based on the ranking of the operators, the assignment program 136 may select a highest ranking operator to be assigned the new incident. For example, the assignment program 136 may select the operator having the highest time weighted success factor $S_t$ across the command groups mapped to the type of incident for the new incident.

The assignment program 136 may also determine an availability of the selected highest ranking operator. For example, based on the information of the operator profile for the highest ranking operator, the assignment program 136 may determine an availability to resolve the new incident. As a result of the highest ranking operator being unavailable (e.g., on vacation, out of office, suspended status, etc.), the assignment program 136 may remove the operator from the list of identified operators for the new incident and select a next highest ranking operator. The assignment program 136 may continue this process until an available operator is selected. The assignment program 136 may also determine a relative urgency of the new incident. For example, if the new incident has a relatively high urgency, the assignment program 136 may perform the availability analysis described above. However, if the new incident has a relatively low urgency where a waiting time to resolve the new incident is available, the assignment program 136 may determine whether the highest ranking operator may be assigned the new incident given the waiting time, particularly when the highest ranking operator is not currently available. Through this process, the assignment program 136 may identify the highest ranking operator and assign the new incident to the highest (e.g., available) ranking operator for subsequent resolution.

Through the manner described above, the assignment server 130 according to the exemplary embodiments is configured to select an operator for assignment to a new incident with an increased probability of efficient resolution. Since the selection of the operator as determined to be the highest ranked is based on previous successes from using a command group that affects the type of incident that the new incident is directed, the exemplary embodiments may assign the new incident to the operator who is already familiar with the commands that may be used in resolving the new incident. Even when the operator has not specifically resolved the type of incident that the new incident is directed, the exemplary embodiments may select the operator based on the operator having used at least a subset of the commands in the command group for which the new incident may be resolved (e.g., according to type of incident). In this manner, the exemplary embodiments provide a more efficient incident resolution process in which a first-responder workload may be reduced, a number of portions of the incident being reassigned may be reduced (e.g., due to an operator not having the correct skills), an overall time and cost may be reduced, etc.

Figure 2:
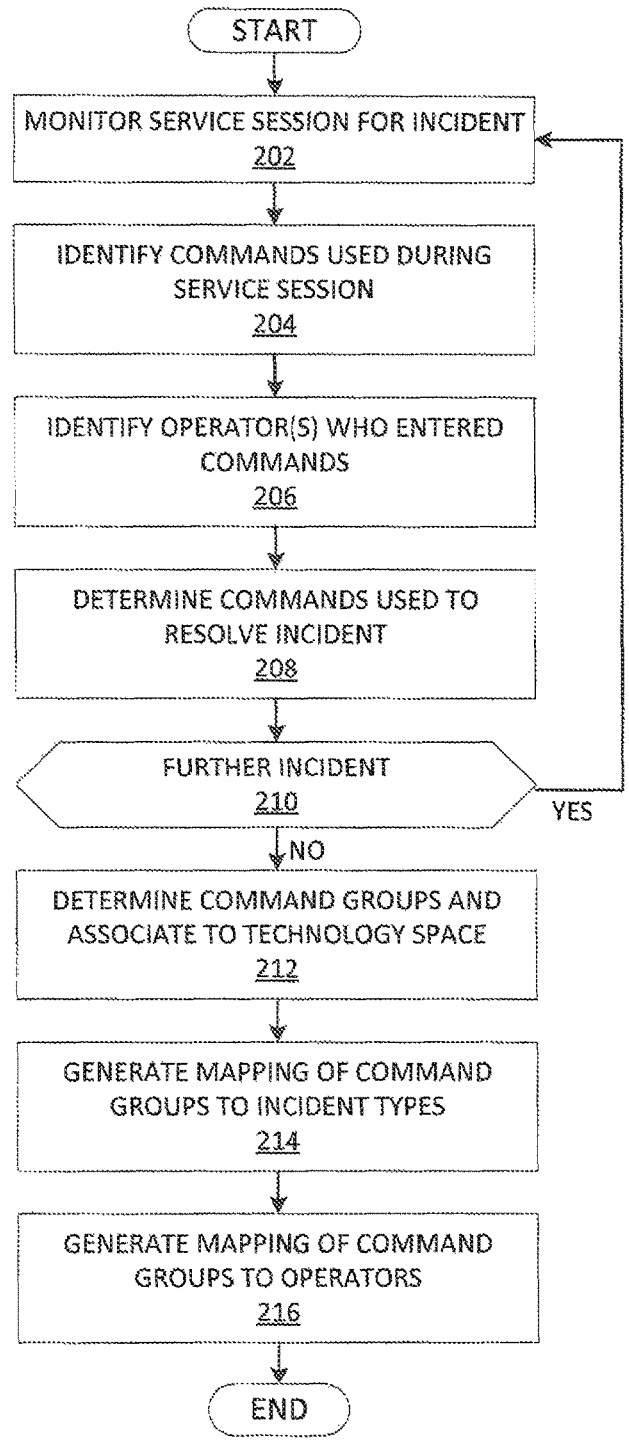
FIG. 2 depicts an exemplary flowchart of a method illustrating the operations of an assignment server 130 of the incident assignment system 100 in generating mappings used to assign an operator to service an incident, in accordance with the exemplary embodiments.

FIG. 2 illustrates an exemplary flowchart of a method 200 illustrating the operations of the mapping program 132 of the assignment server 130 of the incident assignment system 100 in assigning an operator to service an incident, in accordance with the exemplary embodiments. The method 300 may relate to operations that are performed by the mapping program 132 to generate mapping profiles that are used in determining one or more operators who are most suited in resolving a new incident. The method 300 will be described from the perspective of the assignment server 130.

The mapping program 132 may monitor a service session in which an operator is attempting to resolve an incident (step 202). The mapping program 132 may include an incident management application that monitors whenever the performance of an operator who has been assigned to an incident. In monitoring these service sessions, the mapping program 132 may record select parameters of each service session. For example, for each incident, the mapping program 132 may record a type of the incident, an identity of the operator assigned to the incident, the commands entered by each operator assigned to the incident, a success or failure in using each command, a timestamp associated with any aspect of an incident (e.g., when the incident was assigned, a duration taken to resolve the incident, when each command was entered, etc.), fix layers for which the incident is linked, a manufacturer of hardware and/or software components, etc.

To further illustrate the operations of the mapping program 132, reference is now made to an illustrative exemplary embodiment. According to the illustrative exemplary embodiment, at a time prior to a current time when a new incident is reported, the mapping program 132 may monitor a plurality of service sessions performed by a plurality of operators in resolving a plurality of incidents. Each incident may have one or more operators assigned thereto. Each operator may use one or more commands via the service client 112 of respective smart devices 110 in resolving the incident. The mapping program 132 may receive the various types of information that may be identified for each service session.

Based on the information recorded during the monitoring of service sessions, the mapping program 132 may identify commands that are used during the service sessions (step 204). Each operator may enter commands in an attempt to resolve the incident based on their past experiences, their knowledge of the system, instructions received for resolution, etc. The commands that are entered during these service sessions may be identified. Also based on the information recorded during the monitoring of service sessions, the mapping program 132 may identify the one or more operators who entered the commands (step 206). With one or more operators being assigned to the service session, the mapping program 132 may ascertain the identities of these operators. The mapping program 132 may also determine the commands that were used to successfully resolve the incident (step 208). As every command may not lead towards the resolution of the incident, the mapping program 132 may attempt to filter the commands used in resolving the incident which provides at least a partial basis in generating the mappings.

According to the previously introduced exemplary embodiment, in a given incident that was resolved at a time prior to a current time, there may have been three operators who were assigned to resolve the incident. A first operator may have been assigned using any conventional approach. The first operator may have also been assigned according to the exemplary embodiments. The first operator may not have been properly equipped to handle the incident. Thus, after entering a first failed set of commands, the first operator may have been unassigned to the incident. Subsequently, a second operator may have been assigned to the incident. The second operator may have been equipped to handle a portion of the incident. However, the incident may have required another skill set related to a different fix layer for which the first operator was not equipped to handle. For the portion of the incident that the first operator was equipped to handle, the first operator may have entered a first set of commands to successfully resolve this portion of the incident as well as a second failed set of commands which did not aid in the resolution of the incident. At a subsequent time, a third operator may have been assigned to the incident to resolve the remainder of the incident. The third operator may have entered a second set of commands to resolve the remainder of the incident as well as a third failed set of commands which did not aid in the resolution of the incident. The mapping program 132 may identify the first failed, the first, the second failed, the second, and the third failed set of commands that were entered towards the resolution of this incident. Among these commands, the mapping program 132 may determine that the first and the second commands were used in successfully resolving the incident. The mapping program 132 may also identify the first, second, and third operators who were assigned to the incident.

The mapping program 132 may then determine whether there are further incidents that occurred in the time prior to a current time that a new incident is reported (decision 210). As a result of a further incident being present (decision 210, "YES" branch), the mapping program 132 may monitor the service session for this further incident and perform the subsequent steps of identifying the commands used, identifying the one or more operators who entered the commands, and determining the commands used to successfully resolve the further incident. The mapping program 132 may continue to perform these operations for each incident that occurred during the time prior to the current time. As a result of no further incidents being present (decision 210, "NO" branch), the mapping program 132 may continue to generate the mappings.

In generating the mappings, the mapping program 132 may determine command groups and associate the command groups to the appropriate technology space (step 212). The command groups may include one or more commands from the commands that are entered by the operators in the historical incidents that addresses a particular aspect of the incident such as a specific fix layer. The mapping program 132 may group the commands into command groups based on the effect the commands may have towards a particular aspect of the incident. Using the command groups, the mapping program 132 may generate a first mapping between the command groups and the types of incidents (step 214). In generating the first mapping, each incident may be taken as a whole or divided into constituent parts where the incident as a whole or each constituent part represents a type of incident. In this manner, the mapping program 132 may generate the C2E mapping profiles 122. Also using the command groups, the mapping program 132 may generate a second mapping between the command groups and the operators who entered each command of the command groups (step 216). In this manner, the mapping program 132 may generate the C2O mapping profiles 124. As will be described below, the C2E mapping profiles 122 and the C2O mapping profiles 124 may provide a basis upon which to identify an operator equipped to handle future incidents as well as provide a ranking for which an identified operator stands relative to other identified operators.

With reference again to the previously introduced exemplary embodiment, the mapping program 132 may determine that the first set of commands that were used to successfully resolve the incident may be grouped into a first command group directed toward the technology space of the portion of the incident that the first operator resolved. The mapping program 132 may also determine that the second set of commands that were used to successfully resolve the incident may be grouped into a second command group directed toward the technology space of a first portion of a remainder of the incident that the second operator resolved and a third command group directed toward the technology space of a second portion of the remainder of the incident that the second operator resolved. In determining these command groups, the mapping program 132 may generate a plurality of C2E mapping profiles 122 including a first C2E mapping profile 122 involving the first command group directed toward a first technology space, a second C2E mapping profile 122 involving a second command group directed toward a second technology space, and a third C2E mapping profile 122 involving a third command group directed toward a third technology space. The mapping program 132 may also generate a plurality of C2O mapping profiles 124 including a first C2O mapping profile 124 involving the first command group entered by the first operator, a second C2O mapping profile 124 involving the second command group entered by the second operator, and a third C2O mapping profile 124 involving the third command group entered by the second operator.

Figure 3:
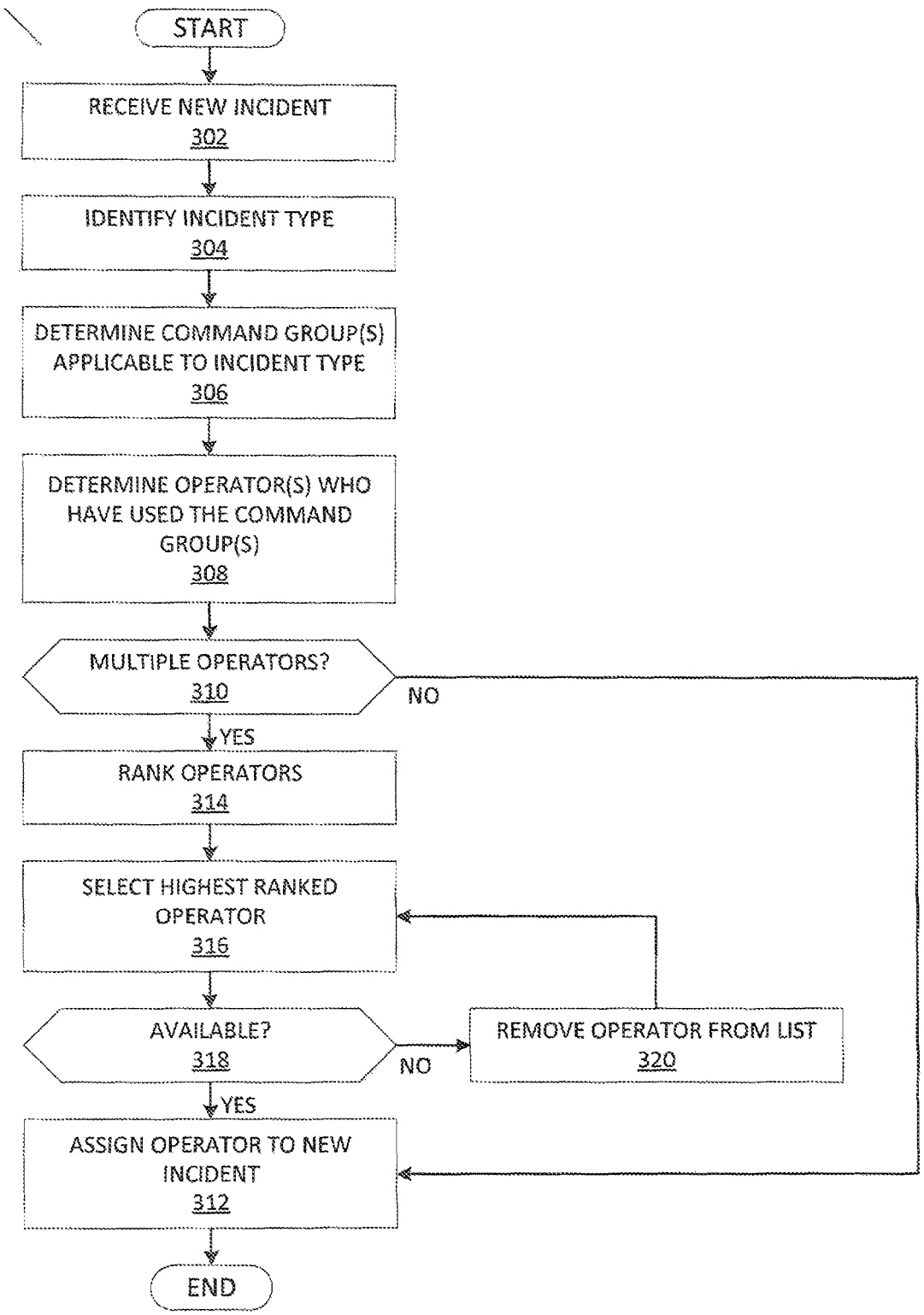
FIG. 3 depicts an exemplary flowchart of a method illustrating the operations of the assignment server 130 of the incident assignment system 100 in assigning an operator to service an incident, in accordance with the exemplary embodiments.

FIG. 3 depicts an exemplary flowchart of a method 300 illustrating the operations of the identification program 134 and the assignment program 136 of the assignment server 130 of the incident assignment system 100 in assigning an operator to an incident, in accordance with the exemplary embodiments. The method 300 may relate to operations that are performed by the identification program 134 and the assignment program 136 to determine which the operators may be selected in being assigned a new incident and selecting one of the operators to the incident. The method 300 will be described from the perspective of the assignment server 130.

The assignment server 130 may receive a new incident (step 302). The new incident may have occurred at a designated time (e.g., a current time). The new incident may be reported in a variety of reporting mechanisms (e.g., via a ticket from a user who noticed the incident, via a maintenance check of the system, etc.). Upon receiving the new incident, the assignment server 130 may identify the type of incident for the new incident. According to an exemplary embodiment, the identification program 134 of the assignment server 130 may be configured to determine the type of incident based on available information linked to the new incident. According to another exemplary embodiment, the identification program 132 may receive information indicating the type of incident for the new incident as determined by a further component or manual entry.

As a result of identifying the one or more types of incident that the new incident may be associated, the identification program 134 may determine one or more command groups applicable to each type of incident (step 306). The identification program 134 may have access to the C2E mapping profiles 122 in the resolution repository 120. As described above, the C2E mapping profiles 122 may indicate a mapping between types of incidents to command groups. Thus, using the C2E mapping profiles 122, the identification program 134 may determine the command groups that may be used for the new incident. The identification program 134 may also determine one or more operators who have used at least a subset of one or more of the command groups (step 308). The identification program 135 may also have access to the C2O mapping profiles 124 in the resolution repository 120. As described above, the C2O mapping profiles 124 may indicate a mapping between operators to command groups in which the operators have entered at least one command in a corresponding command group. Thus, using the C2O mapping profiles 124, the identification program 134 may determine the operators that may be assigned to the new incident.

To further illustrate the operations of the mapping program 132, reference is now made to an illustrative exemplary embodiment. According to the illustrative exemplary embodiment, a new incident may be reported based on a ticket opened by a user who contacted an administrative system and provided details with regard to a feature that did not appear to be operating properly. The administrative system may be configured to receive the information from the user and analyze the underlying components (e.g., fix layers) involved in providing the feature. The administrative system may also be configured to identify that the new incident involves two different types of incidents. The identification program 134 may receive the information from the administrative system regarding the new incident and the types of incidents in which the new incident is involved. The identification program 134 may utilize the C2E mapping profiles 122 to determine the command groups including various commands that may be used for the two types of incidents. The identification program 134 may also utilize the C2O mapping profiles 124 to determine the operators who have entered at least one command in the command groups associated with the two types of incidents for the new incident.

The identification program 134 may provide the one or more operators who are identified as prospects for assignment to the new incident to the assignment program 136. The assignment program 136 may determine whether there are multiple operators who have been listed by the identification program 134 (decision 310). As a result of only one operator being listed (decision 310, "NO" branch), the assignment program 136 may assign the new incident to the identified operator (step 312). As a result of the multiple operators being listed (decision 310, "YES" branch), the assignment program 136 may proceed in selecting one of the listed operators according to a ranking standard.

The assignment program 136 may utilize a variety of different mechanisms in order to rank the identified operators for the new incident (step 314). For example, the assignment program 136 may rank the operators according to historical performance and the results of being assigned to historical incidents (e.g., successes and failures). The assignment program 136 may also consider a timeframe in which the operators were tasked with resolving historical incidents. For example, the assignment program 136 may utilize Equations 1-3 to determine a time weighted success factor $S_t$ for each operator identified for the new incident based on the incident types. Using the time weighted success factors for the operators identified for the new incident, the assignment program 136 may rank the operators in order. Based on the ordering of the operators, the assignment program 136 may selected a highest ranked operator among the identified operators for the new incident (step 316). The assignment program 136 may determine whether the highest ranked operator is available (decision 318). For example, the highest ranked operator may be on a different assignment which takes precedence over the new incident. In another example, the highest ranked operator may require at least some time before being assigned the new incident. As a result of the highest ranked operator being available (decision 318, "YES" branch), the assignment program 136 assigns the new incident to the highest ranked operator (step 312). As a result of the highest ranked operator being unavailable (decision 318, "NO" branch), the assignment program 136 may remove the highest ranked operator from the list of operators identified for the new incident (step 320). The updated list has a new highest ranked operator among the operators. Thus, the assignment program 136 may determine whether the new highest ranked operator is available. This process may continue until a highest ranked operator who is available is identified and assigned to the new incident.

According to the previously introduced exemplary embodiment, the identification program 134 may have identified three operators who have used commands included in the command groups determined to be associated with a first one of the two types of incidents linked to the new incident and identified four operators who have used commands included in the command groups determined to be associated with a second one of the two types of incidents linked to the new incident. The identification program 134 may provide the list of operators for each type of incident to the assignment program 136. The assignment program 136 may analyze each operator and determine a ranking for each type of incident. For example, the assignment program 136 may use the information of the operators based on performance for historical incidents and rank the operators for each type of incident according to Equations 1-3. In performing this operation, the assignment program 136 may determine that for the first type of incident, operator A is ranked highest, operator B is ranked second highest, and operator C is ranked third highest while for the second type of incident, operator W is ranked highest, operator X is ranked second highest, operator Y is ranked third highest, and operator Z is ranked fourth highest. Based on these rankings, the assignment program 136 may determine an availability of the operators for each type of incident. For example, the assignment program 136 may review a schedule of each operator and current assignments. In this analysis, the assignment program 136 may determine that operator A is available. Thus, the assignment program 136 may assign operator A to the new incident with regard to the first type of incident. The assignment program 136 may determine that operator W is on vacation and operator X is currently on a lengthy project and will not be available within an acceptable timeframe to resolve the new incident (e.g., the new incident has an urgency parameter that indicates a maximum acceptable resolution timeframe from reporting). Accordingly, the assignment program 136 may assign operator Y to the new incident with regard to the second type of incident.

The exemplary embodiments are configured to assign an incident to an operator based on commands that the operator has previously used in resolving historical incidents. The exemplary embodiments may generate a first mapping that maps command groups to types of incidents where each command group includes one or more commands. The exemplary embodiments may generate a second mapping that maps command groups to operators who entered at least one command in the command group. Based on the first and second mappings, the exemplary embodiments may identify a type of incident that a new incident may be linked. The exemplary embodiments may use the first mapping to identify at least one command group and use the second mapping to identify at least one operator who may be assigned to the new incident. The exemplary embodiments may then select an operator to be assigned to the new incident based on this historical use of commands that successfully resolved a historical incident.

Figure 4:
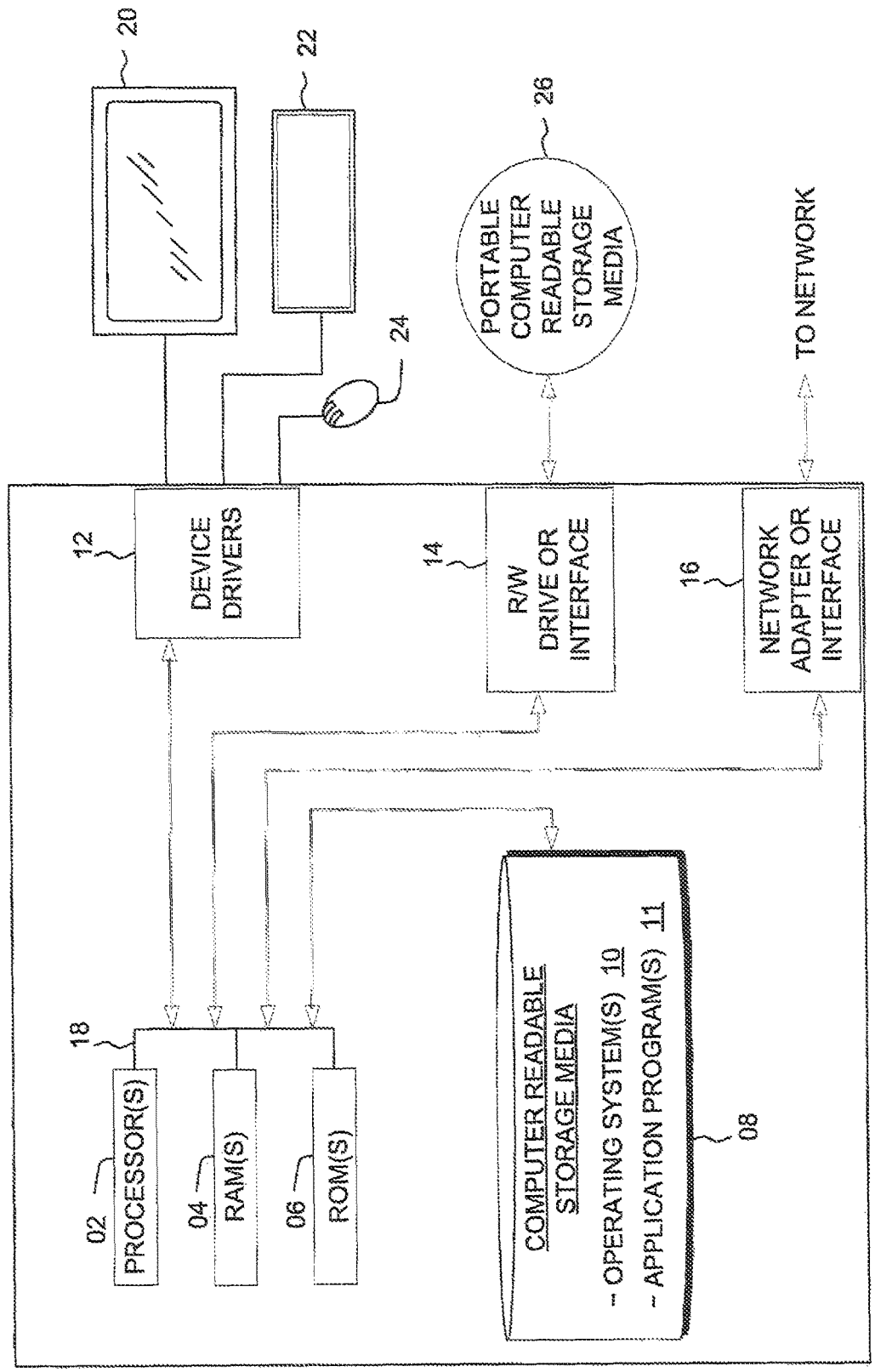
FIG. 4 depicts an exemplary block diagram depicting the hardware components of the incident assignment system 100 of FIG. 1, in accordance with the exemplary embodiments.

FIG. 4 depicts a block diagram of devices within the incident assignment system 100 of FIG. 1, in accordance with the exemplary embodiments. It should be appreciated that FIG. 4 provides only an illustration of one implementation and does not imply any limitations with regard to the environments in which different embodiments may be implemented. Many modifications to the depicted environment may be made.

Devices used herein may include one or more processors 02, one or more computer-readable RAMs 04, one or more computer-readable ROMs 06, one or more computer readable storage media 08, device drivers 12, read/write drive or interface 14, network adapter or interface 16, all interconnected over a communications fabric 18. Communications fabric 18 may be implemented with any architecture designed for passing data and/or control information between processors (such as microprocessors, communications and network processors, etc.), system memory, peripheral devices, and any other hardware components within a system.

One or more operating systems 10, and one or more application programs 11 are stored on one or more of the computer readable storage media 08 for execution by one or more of the processors 02 via one or more of the respective RAMs 04 (which typically include cache memory). In the illustrated embodiment, each of the computer readable storage media 08 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Devices used herein may also include a R/W drive or interface 14 to read from and write to one or more portable computer readable storage media 26. Application programs 11 on said devices may be stored on one or more of the portable computer readable storage media 26, read via the respective R/W drive or interface 14 and loaded into the respective computer readable storage media 08.

Devices used herein may also include a network adapter or interface 16, such as a TCP/IP adapter card or wireless communication adapter (such as a 4G wireless communication adapter using OFDMA technology). Application programs 11 on said computing devices may be downloaded to the computing device from an external computer or external storage device via a network (for example, the Internet, a local area network or other wide area network or wireless network) and network adapter or interface 16. From the network adapter or interface 16, the programs may be loaded onto computer readable storage media 08. The network may comprise copper wires, optical fibers, wireless transmission, routers, firewalls, switches, gateway computers and/or edge servers.

Devices used herein may also include a display screen 20, a keyboard or keypad 22, and a computer mouse or touchpad 24. Device drivers 12 interface to display screen 20 for imaging, to keyboard or keypad 22, to computer mouse or touchpad 24, and/or to display screen 20 for pressure sensing of alphanumeric character entry and user selections. The device drivers 12, R/W drive or interface 14 and network adapter or interface 16 may comprise hardware and software (stored on computer readable storage media 08 and/or ROM 06).

The programs described herein are identified based upon the application for which they are implemented in a specific one of the exemplary embodiments. However, it should be appreciated that any particular program nomenclature herein is used merely for convenience, and thus the exemplary embodiments should not be limited to use solely in any specific application identified and/or implied by such nomenclature.

Based on the foregoing, a computer system, method, and computer program product have been disclosed. However, numerous modifications and substitutions can be made without deviating from the scope of the exemplary embodiments. Therefore, the exemplary embodiments have been disclosed by way of example and not limitation.

It is to be understood that although this disclosure includes a detailed description on cloud computing, implementation of the teachings recited herein are not limited to a cloud computing environment. Rather, the exemplary embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
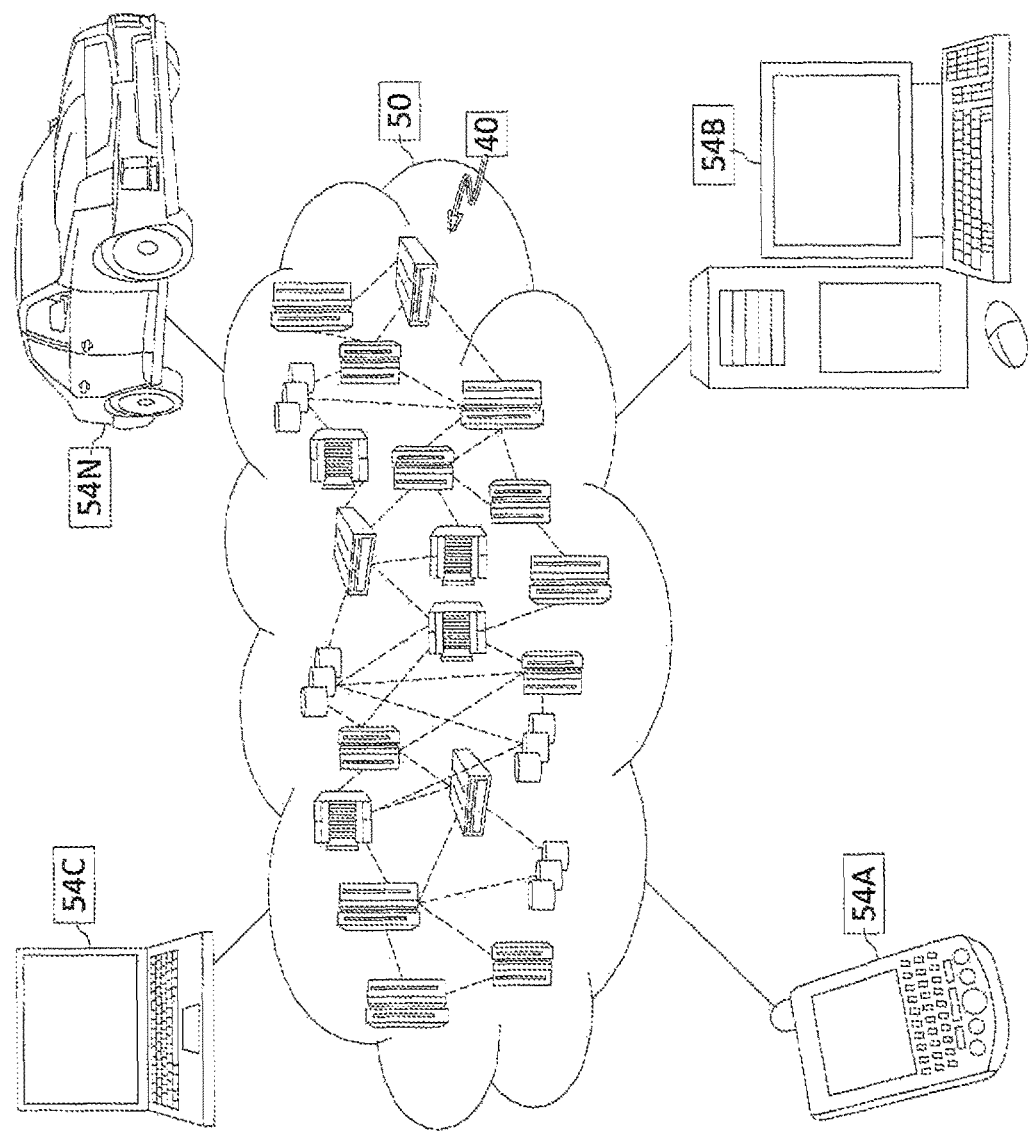
FIG. 5 depicts a cloud computing environment, in accordance with the exemplary embodiments.

Referring now to FIG. 5, illustrative cloud computing environment 50 is depicted. As shown, cloud computing environment 50 includes one or more cloud computing nodes 40 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 40 and cloud computing environment 50 can communicate with any type of computerized device over any type of network and/or network addressable connection (e.g., using a web browser).

Figure 6:
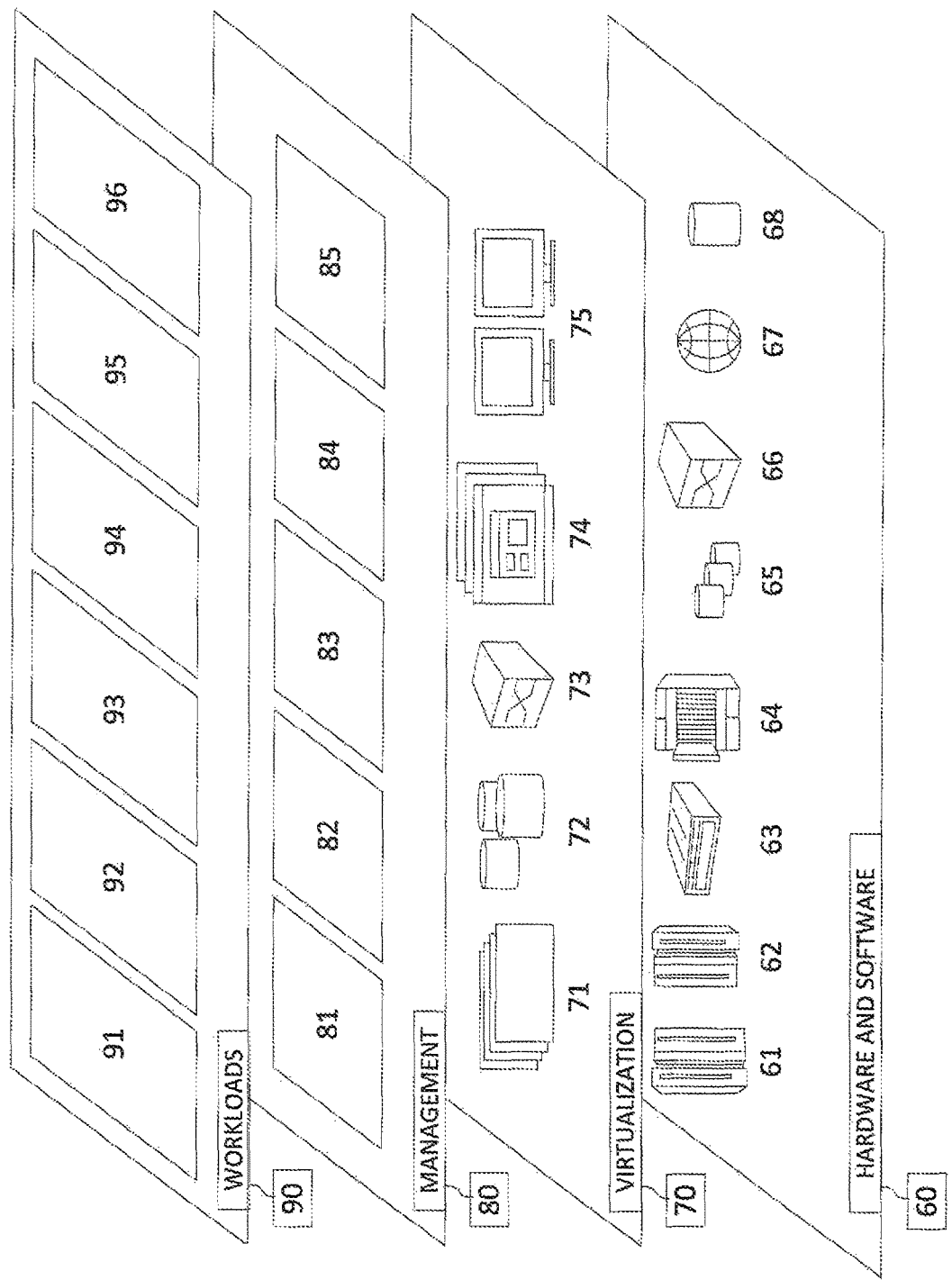
FIG. 6 depicts abstraction model layers, in accordance with the exemplary embodiments.

Referring now to FIG. 6, a set of functional abstraction layers provided by cloud computing environment 50 (FIG. 5) is shown. It should be understood in advance that the components, layers, and functions shown in FIG. 6 are intended to be illustrative only and the exemplary embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and assignment processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method for assigning an operator to service an incident, the method comprising:
   determining a type of incident associated with the incident;
   determining a command group applicable for use based on the type of incident according to a first mapping, the first mapping indicative of a mapping between the command group and the type of incident based on historical resolutions of historical incidents, the command group including at least one command used in resolving the type of incident for a historical incident;
   determining a plurality of operators who have used the command group according to a second mapping, the second mapping indicative of a many-to-many mapping between the command group and the operators based on historical resolutions of historical incidents, the operators having used at least one command in the command group;
   ranking the plurality of operators based at least on the second mapping, the ranking indicative of a probability of success in resolving the incident based on a respective historical performance by the plurality of operators; and
   assigning a highest ranked one of the operators to the incident.

2. The computer-implemented method of claim 1, wherein the historical performance of the operators includes a weighting factor indicative of a successful resolution, a relative success rate between the operator and the plurality of operators for a given time window, a relative failure rate between the operator and the plurality operators for the given time window, a smoothing factor for factors contributing to an overall success factor, a time-weighted success factor at a given time, or a combination thereof.

3. The computer-implemented method of claim 1, further comprising:
   monitoring service sessions for historical incidents; and
   recording a plurality of aspects of the service sessions.

4. The computer-implemented method of claim 3, further comprising:
   determining the command group based on an association to an identified technology space for which the historical incident is involved.

5. The computer-implemented method of claim 1, wherein the first mapping is a many to many mapping between at least one command group and at least one type of incident.

6. A computer program product for assigning an operator to service an incident, the computer program product comprising:
   one or more non-transitory computer-readable storage media and program instructions stored on the one or more non-transitory computer-readable storage media capable of performing a method, the method comprising:
      determining a type of incident associated with the incident;
      determining a command group applicable for use based on the type of incident according to a first mapping, the first mapping indicative of a mapping between the command group and the type of incident based on historical resolutions of historical incidents, the command group including at least one command used in resolving the type of incident for a historical incident;
      determining a plurality of operators who have used the command group according to a second mapping, the second mapping indicative of a many-to-many mapping between the command group and the operators based on historical resolutions of historical incidents, the operators having used at least one command in the command group;
      ranking the plurality of operators based at least on the second mapping, the ranking indicative of a probability of success in resolving the incident based on a respective historical performance by the plurality of operators; and
      assigning a highest ranked one of the operators to the incident.

7. The computer program product of claim 6, wherein the historical performance of the operators includes a weighting factor indicative of a successful resolution, a relative success rate between the operator and the plurality of operators for a given time window, a relative failure rate between the operator and the plurality operators for the given time window, a smoothing factor for factors contributing to an overall success factor, a time-weighted success factor at a given time, or a combination thereof.

8. The computer program product of claim 6, wherein the method further comprises:
   monitoring service sessions for historical incidents; and
   recording a plurality of aspects of the service sessions.

9. The computer program product of claim 8, wherein the method further comprises:
   determining the command group based on an association to an identified technology space for which the historical incident is involved.

10. The computer program product of claim 6, wherein the first mapping is a many to many mapping between at least one command group and at least one type of incident.

11. A computer system for assigning an operator to service an incident, the computer system comprising:
   one or more computer processors, one or more computer-readable storage media, and program instructions stored on the one or more of the computer-readable storage media for execution by at least one of the one or more processors capable of performing a method, the method comprising:
      determining a type of incident associated with the incident;
      determining a command group applicable for use based on the type of incident according to a first mapping, the first mapping indicative of a mapping between the command group and the type of incident based on historical resolutions of historical incidents, the command group including at least one command used in resolving the type of incident for a historical incident;
      determining a plurality of operators who have used the command group according to a second mapping, the second mapping indicative of a many-to-many mapping between the command group and the operators based on historical resolutions of historical incidents, the operators having used at least one command in the command group;
      ranking the plurality of operators based at least on the second mapping, the ranking indicative of a probability of success in resolving the incident based on a respective historical performance by the plurality of operators; and
      assigning a highest ranked one of the operators to the incident.

12. The computer system of claim 11, wherein the historical performance of the operators includes a weighting factor indicative of a successful resolution, a relative success rate between the operator and the plurality of operators for a given time window, a relative failure rate between the operator and the plurality operators for the given time window, a smoothing factor for factors contributing to an overall success factor, a time-weighted success factor at a given time, or a combination thereof.

13. The computer system of claim 11, wherein the method further comprises:
   monitoring service sessions for historical incidents; and
   recording a plurality of aspects of the service sessions.

14. The computer system of claim 13, wherein the method further comprises:
   determining the command group based on an association to an identified technology space for which the historical incident is involved.

* * * * *